United States Patent
Koberstein et al.

(10) Patent No.: US 10,315,490 B2
(45) Date of Patent: Jun. 11, 2019

(54) NOISE-ATTENUATING SNORKEL DUCT FOR AIR-HANDLING SYSTEM RECIRCULATION VENT

(71) Applicant: Ford Global Technologies, LLC, Dearborn, MI (US)

(72) Inventors: Manfred Koberstein, Troy, MI (US); John Azar, LaSalle (CA); Zhengyu Liu, Novi, MI (US); Eric R. Yerke, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1163 days.

(21) Appl. No.: 14/327,831

(22) Filed: Jul. 10, 2014

(65) Prior Publication Data

US 2016/0009162 A1    Jan. 14, 2016

(51) Int. Cl.
    *B60H 1/00*         (2006.01)

(52) U.S. Cl.
    CPC ..... *B60H 1/00564* (2013.01); *B60H 1/00028* (2013.01); *B60H 2001/006* (2013.01); *B60H 2001/00085* (2013.01)

(58) Field of Classification Search
    CPC ............ B60H 1/00504; B60H 1/00028; B60H 1/00564; B60H 1/247; B60H 1/24; B60H 1/248; B60H 1/00; F24F 13/06
    USPC ................... 454/162, 141–143, 69
    See application file for complete search history.

(56) References Cited

U.S. PATENT DOCUMENTS

| | | | | |
|---|---|---|---|---|
| 4,022,599 | A   | 5/1977  | Wilson et al. | |
| 5,971,287 | A * | 10/1999 | Kettner ............... | B60H 1/00742 165/230 |
| 6,332,330 | B1 * | 12/2001 | Loup .................. | B60H 1/00028 165/42 |
| 9,168,811 | B2 * | 10/2015 | Bailey ................ | B60H 1/00849 |
| 2001/0039178 | A1 * | 11/2001 | Elliot ................. | B60H 1/00028 454/121 |
| 2002/0025772 | A1 * | 2/2002 | Egami ................ | B60H 1/00849 454/121 |
| 2006/0065389 | A1 * | 3/2006 | Huang ............... | B60H 1/00028 165/222 |
| 2007/0218824 | A1 * | 9/2007 | Bailey ................ | B60H 1/00849 454/139 |
| 2011/0162901 | A1 * | 7/2011 | Lucas ................ | B60H 1/00278 180/68.2 |

(Continued)

FOREIGN PATENT DOCUMENTS

JP         H06106970      *   4/1994

*Primary Examiner* — Steven B McAllister
*Assistant Examiner* — Ko-Wei Lin
(74) *Attorney, Agent, or Firm* — Vichit Chea; Price Heneveld LLP (57) ABSTRACT

A vehicular air-handling system includes a blower assembly for a vehicle having a fan and a return-air baffle operable between a fresh-air position. The fan is in communication with a fresh-air duct and a recirculating position and the fan is at least partially in communication with a recirculating duct. A noise-attenuating end of the recirculating duct is positioned below an instrument panel of the vehicle and oriented substantially perpendicular to a portion of a floor below the instrument panel, wherein noise from the fan drawing air through the recirculating duct is directed into the floor below the instrument panel.

20 Claims, 9 Drawing Sheets

(56) References Cited

U.S. PATENT DOCUMENTS

2011/0165830 A1* 7/2011 Smith ................ B60H 1/00278
454/75
2012/0315835 A1 12/2012 Maranville et al.
2014/0083672 A1* 3/2014 Rollinson .......... B60H 1/00764
165/202
2014/0196866 A1* 7/2014 Bezzina ............. B60H 1/00278
165/42

* cited by examiner

NOISE-ATTENUATING SNORKEL DUCT FOR AIR-HANDLING SYSTEM RECIRCULATION VENT

FIELD OF THE INVENTION

The present invention generally relates to vehicle air-handling systems, and more specifically, a downwardly oriented snorkel duct for a vehicle's air-handling recirculation functions.

BACKGROUND OF THE INVENTION

Automobiles generally include air-handling systems for providing heated or cooled air to various portions of the passenger cabin of the vehicle. Where cooling functions are present, an air conditioner is incorporated into the air-handling system. Certain vehicles can include a recirculation system that draws air from the passenger cabin that has been at least partially cooled by the air conditioner of the vehicle air-handling system. This function can provide additional cooling for the air provided to the passenger cabin.

SUMMARY OF THE INVENTION

According to one aspect of the present invention, a vehicular air-handling system includes a blower assembly for a vehicle having a fan and a return-air baffle operable between fresh air and recirculating positions. In the fresh-air position, the fan is in communication with a fresh-air duct and in the recirculating position, and the fan is at least partially in communication with a recirculating duct. A noise-attenuating end of the recirculating duct is positioned below an instrument panel of the vehicle and oriented substantially perpendicular to a portion of a floor below the instrument panel. Noise from the fan drawing air through the recirculating duct is directed into the floor below the instrument panel.

According to another aspect of the present invention, a vehicular air-handling system includes a blower assembly having a fan and a recirculating duct having an upper end in communication with the fan and a noise-attenuating end positioned proximate a lower-front portion of a passenger cabin and directed substantially perpendicular to a floor at the lower-front portion. Noise from the fan is at least partially directed through the noise-attenuating end and into the floor at the lower-front portion.

According to another aspect of the present invention, a vehicular air-handling system includes a blower assembly disposed within a vehicle instrument panel and having a fan and a recirculating duct in communication with the fan and having a noise-attenuating end including a longitudinal axis. The longitudinal axis of the noise-attenuating end is positioned substantially normal to a surface of a floor disposed below the vehicle instrument panel. Noise from the noise-attenuating end is directed into the surface of the floor.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
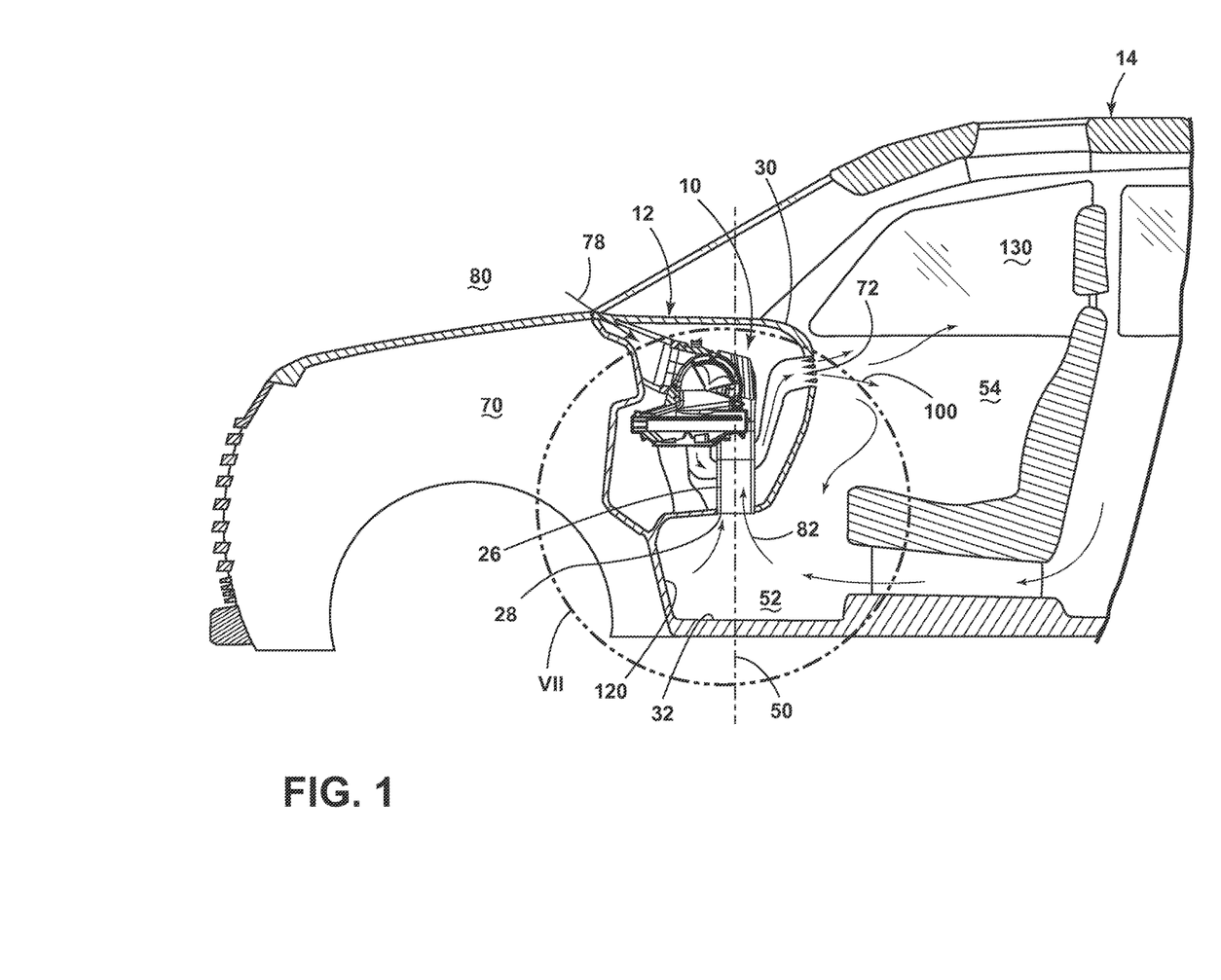
FIG. 1 is a partial cross-sectional view of a vehicle incorporating an embodiment of a recirculating snorkel duct.
Figure 2:
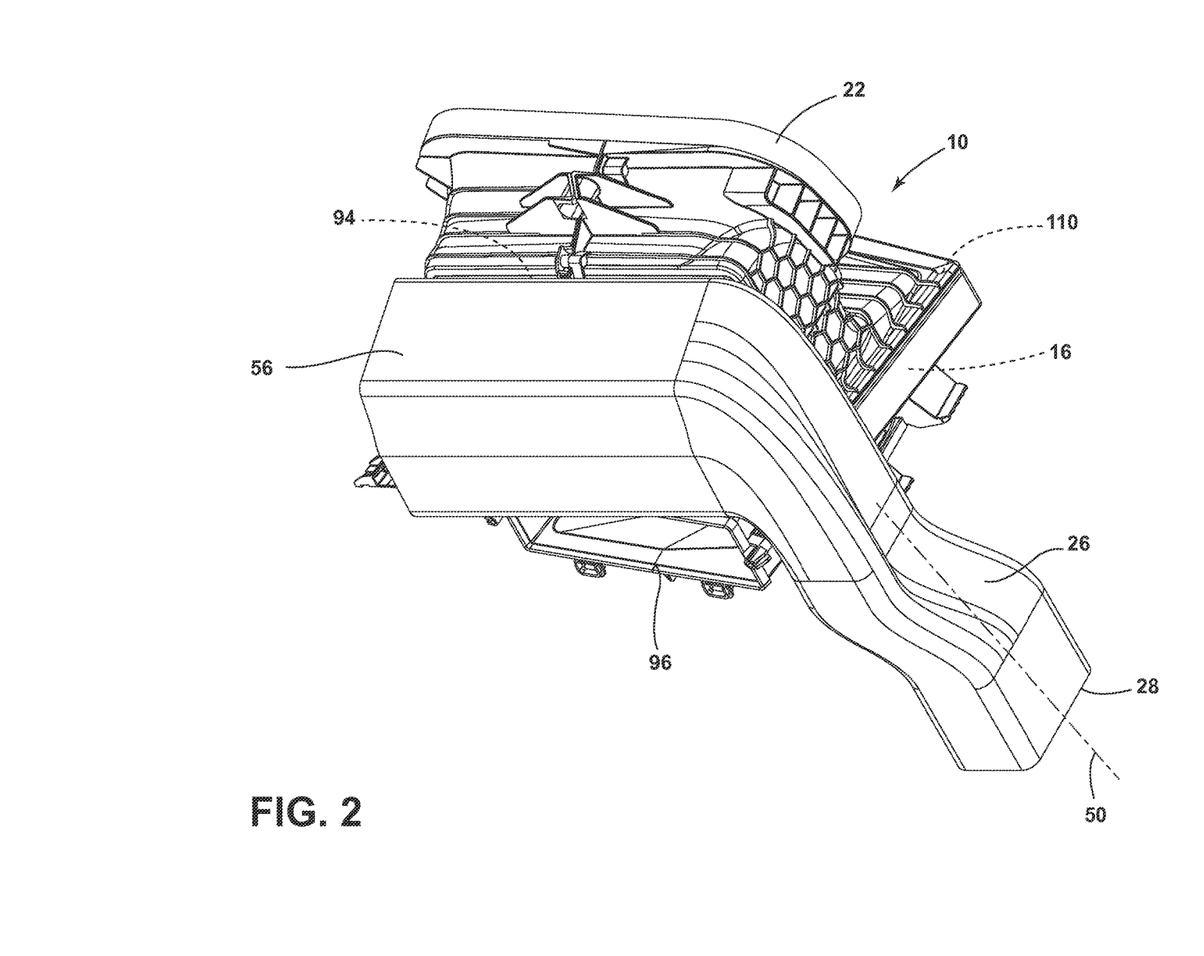
FIG. 2 is a top perspective view of a blower assembly for a vehicle air-handling system incorporating an alternate embodiment of the recirculating snorkel duct.
Figure 3:
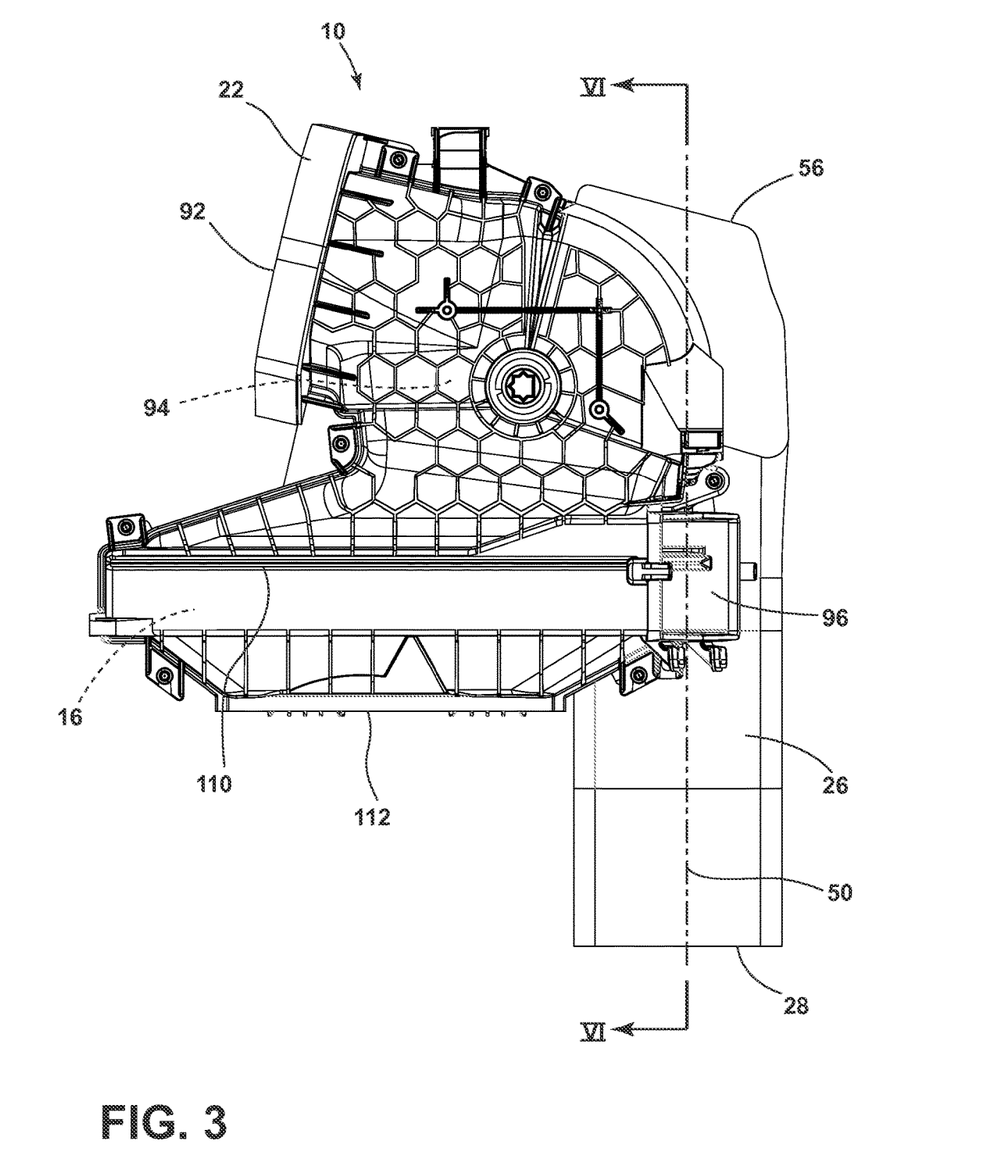
FIG. 3 is a first side elevational view of the blower assembly of FIG. 2.
Figure 4:
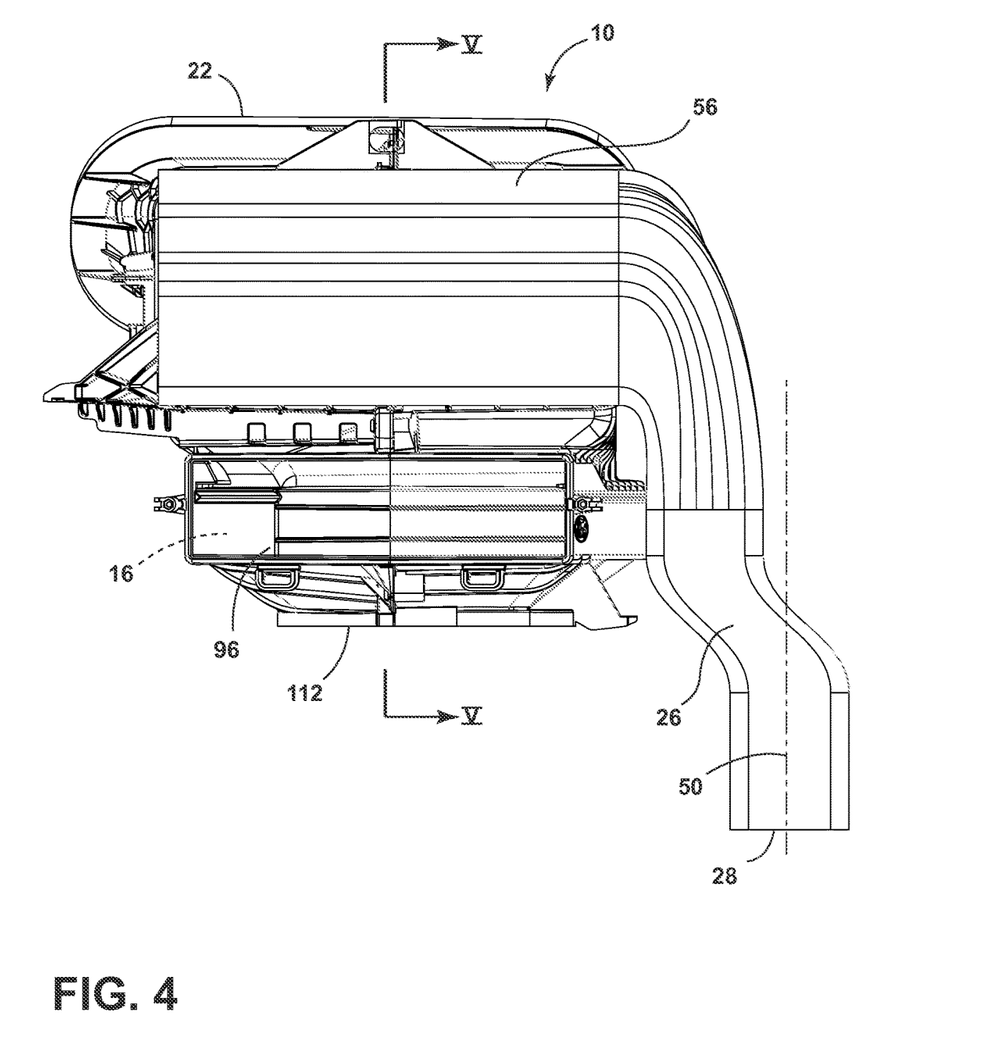
FIG. 4 is a second side elevational view of the vehicle blower assembly of FIG. 2.
Figure 5:
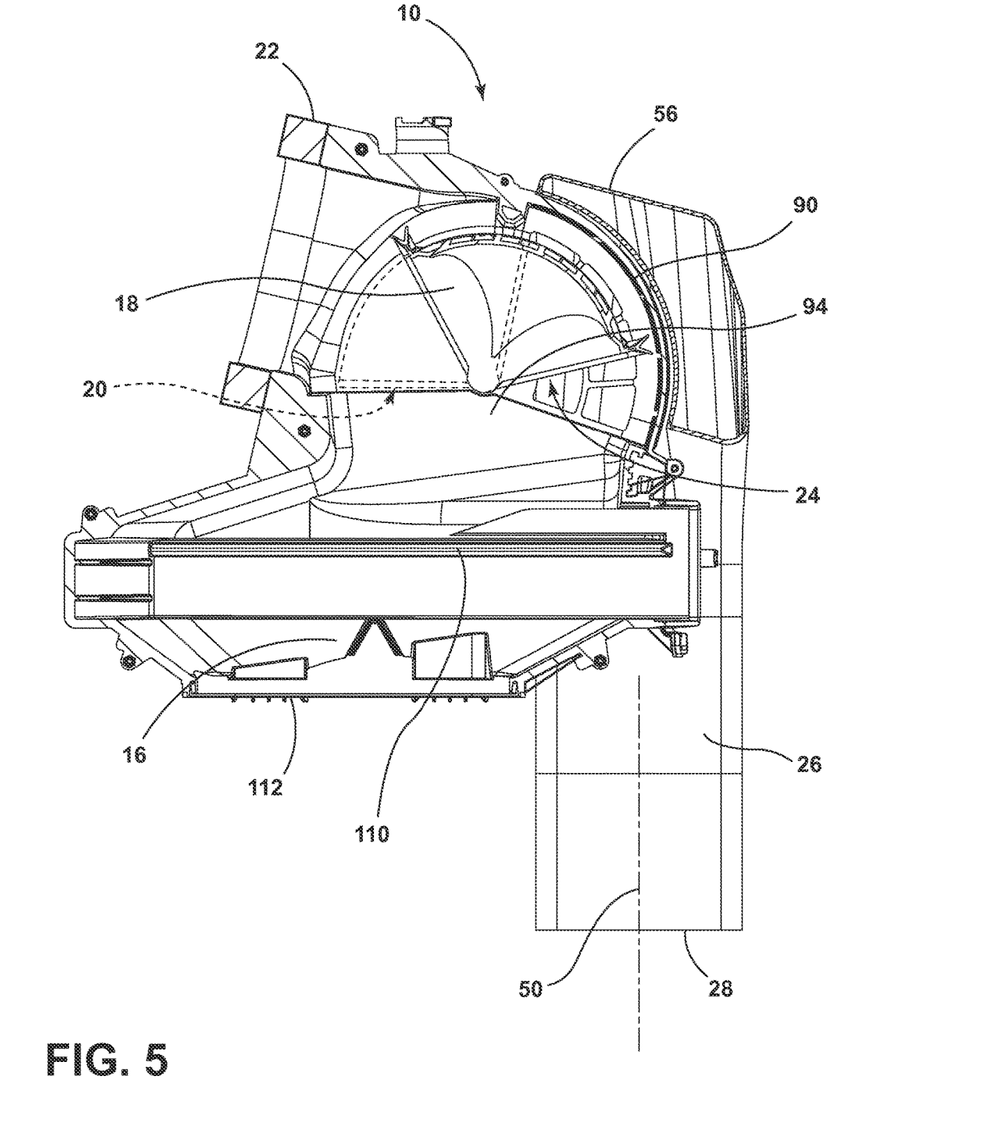
FIG. 5 is a cross-sectional view of the vehicle blower assembly of FIG. 4 taken along line V-V.
Figure 6:
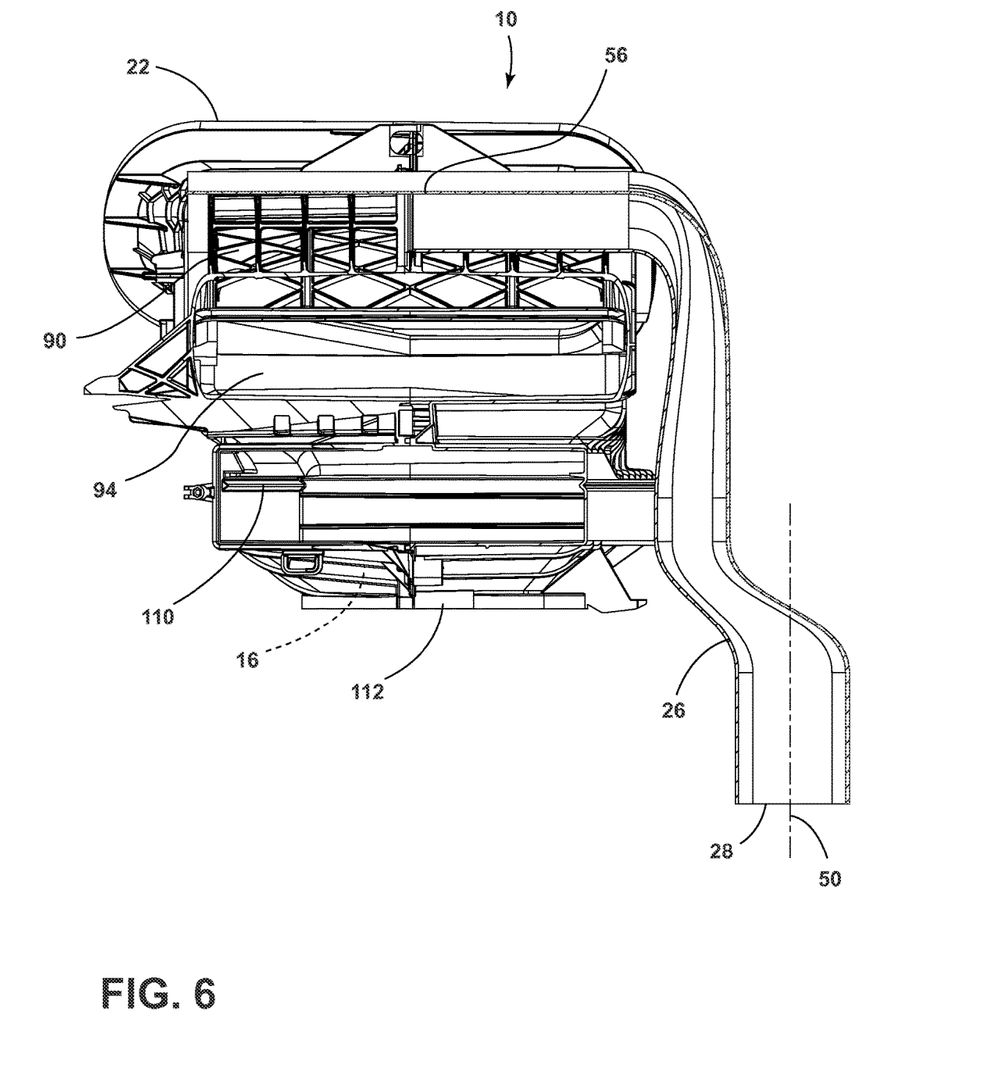
FIG. 6 is a cross-sectional view of the vehicle blower assembly of FIG. 3 taken along line VI-VI.
Figure 7:
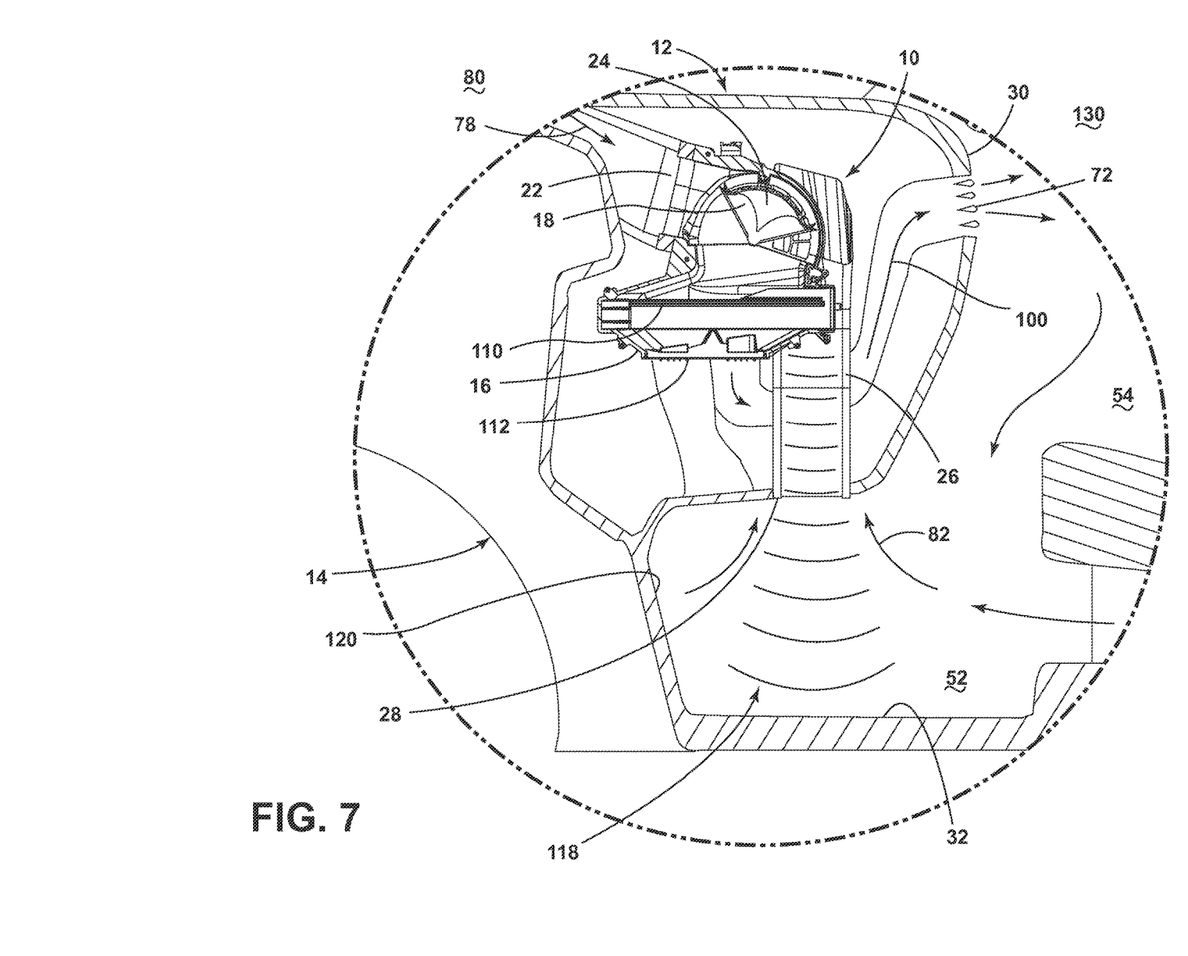
FIG. 7 is an enlarged partial cross section of the recirculating snorkel duct of FIG. 1 taken at area VII.
Figure 8:
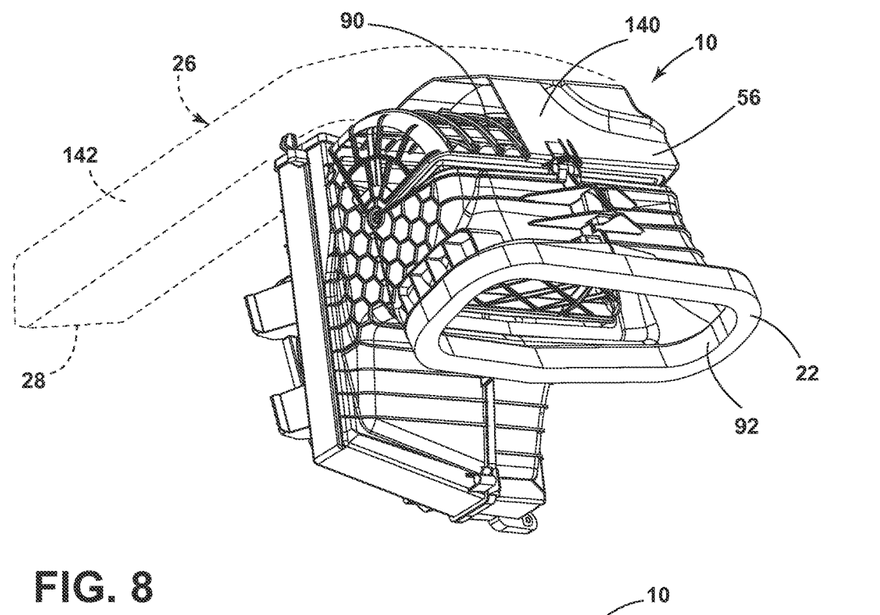
FIG. 8 is a top perspective view of a vehicle blower assembly incorporating an alternate embodiment of the recirculating snorkel duct.
Figure 9:
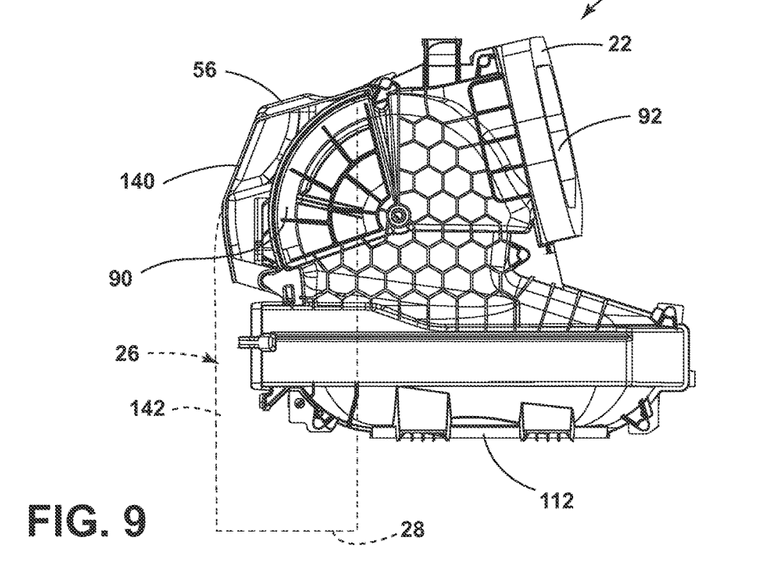
FIG. 9 is a first side elevational view of the vehicle blower assembly of FIG. 7.
Figure 10:
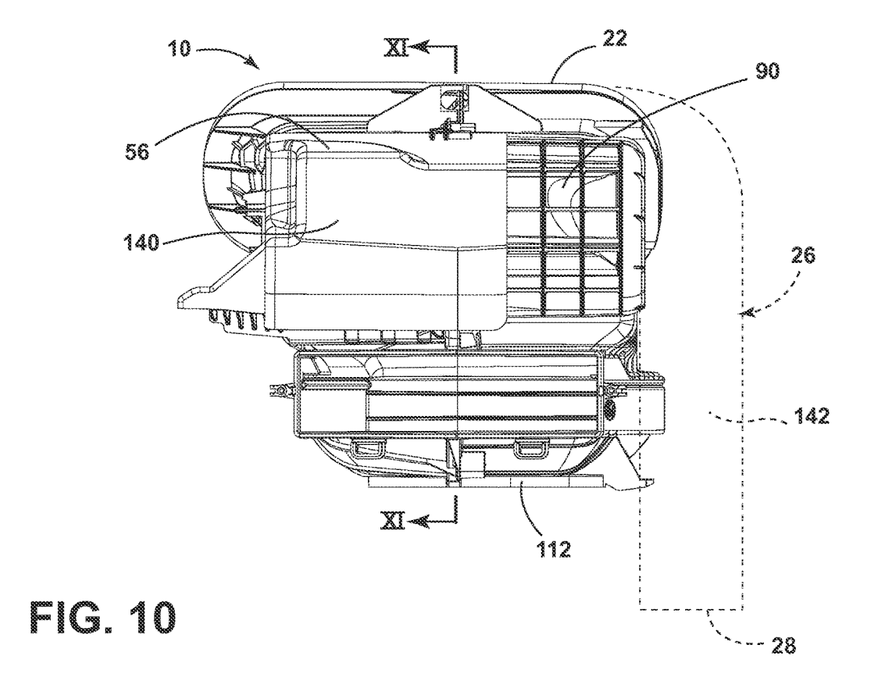
FIG. 10 is a second side elevational view of the vehicle blower assembly of FIG. 7.
Figure 11:
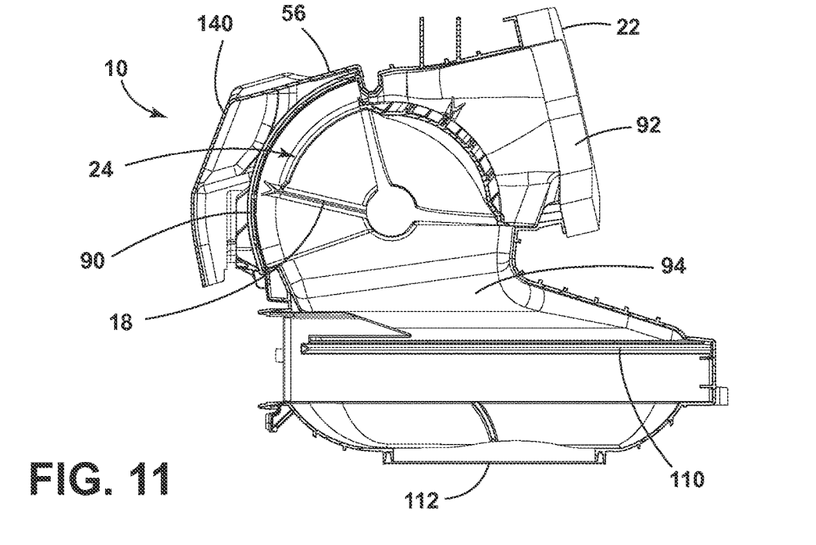
FIG. 11 is a cross-sectional view of the vehicle blower assembly of FIG. 9 taken along line X-X.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-7, reference numeral 10 generally refers to a blower assembly for an air-handling system of a vehicle 14. The air-handling system 12 includes a blower assembly 10 for the vehicle 14, where the blower assembly 10 includes a fan 16. A return-air baffle 18 is disposed within the air-handling system 12, wherein the return-air baffle 18 is operable between a fresh-air position 20, where the fan 16 is in communication with a fresh-air duct 22, and a recirculating position 24, where the fan 16 is at least partially in communication with a recirculating snorkel duct 26. A noise-attenuating end 28 of the recirculating snorkel duct 26 is positioned below an instrument panel 30 of the vehicle 14. The noise-attenuating end 28 is oriented substantially perpendicular to a portion of a floor 32 of the vehicle 14 below the instrument panel 30. Noise traveling through the recirculating snorkel duct 26 as a result of the fan 16 drawing air through the recirculating snorkel duct 26 is directed substantially perpendicular into the floor 32 below the instrument panel 30. In this manner, the noise-attenuating end 28 of the recirculating snorkel duct 26 includes a longitudinal axis 50, wherein the longitudinal axis 50 of the recirculating snorkel duct 26 is positioned substantially normal to the floor 32 below the instrument panel 30. It is contemplated that the noise-attenuating end 28 of the recirculating snorkel duct 26 is adapted to draw air from a lower-front region 52 of the passenger cabin 54 of the vehicle 14 in the area of the floor 32 below the instrument panel 30. The recirculating snorkel duct 26 then delivers the drawn air to an upper end 56 of the recirculating snorkel duct 26 that is connected with the blower assembly 10, such that the drawn air can be delivered into the blower assembly 10. As used herein, the term instrument panel 30, as known by those of skill in the art, includes the entire front assembly proximate the front of the passenger cabin 54 between the passenger and driver side doors. This assembly is sometimes referred to in common usage as a dashboard. Consequently, the area below the instrument panel 30 includes the areas of the passenger cabin 54 at the feet of the driver and passenger, as well as those areas inbetween.

Referring again to FIGS. 1 and 7, the blower assembly 10 for the air-handling system 12 of the vehicle 14 can be disposed behind the instrument panel 30 of the vehicle 14 between the passenger cabin 54 and the engine compartment 70 of the vehicle 14. In this manner, the blower assembly 10, and in particular the recirculating snorkel duct 26, can be positioned substantially over a portion of the floor 32 of the passenger cabin 54. Additionally, the location of the blower assembly 10, separated from the engine compartment 70, substantially limits the amount of heat from the engine compartment 70 that may infiltrate the air-handling system 12 of the vehicle 14. Additionally, the blower assembly 10 is positioned in this location such that the distance that air must travel in order to be delivered from the blower assembly 10 throughout air vents 72 in the instrument panel 30 and into the passenger cabin 54 is substantially minimized.

Referring now to the embodiment of FIGS. 1 and 3-7, the return-air baffle 18 of the air-handling system 12 can be disposed within the blower assembly 10 for the vehicle 14. In this manner, the blower assembly 10 is attached to the fresh-air duct 22 that is in communication with the exterior 80 of the vehicle 14 and is adapted to draw fresh air 78 from the exterior 80 of the vehicle 14 into the blower assembly 10 and through the fan 16 for delivery into the passenger cabin 54. In the various embodiments, the return-air baffle 18 is operable between the fresh-air and recirculating positions 24 in order to deliver appropriate amounts of fresh air 78 from the fresh-air duct 22 and recirculated air 82 from the passenger cabin 54, through the recirculating snorkel duct 26, and into the blower assembly 10 for redelivery into the passenger cabin 54. Where the return-air baffle 18 is disposed in the recirculating position 24, it is contemplated that in various embodiments, the recirculating position 24 places the fan 16 in communication with both the recirculating snorkel duct 26 and the fresh-air duct 22. In this manner, at least a portion of the air moved through the blower assembly 10 continually includes fresh air 78 that is delivered through the air vents 72 and into the passenger cabin 54 of the vehicle 14 through the air-handling system 12.

Referring now to FIGS. 2-7, the blower assembly 10 of the air-handling system 12 of a vehicle 14 can include a recirculating aperture 90 and a fresh-air aperture 92, wherein the recirculating aperture 90 is in communication with the recirculating snorkel duct 26 and the fresh-air aperture 92 is in communication with a fresh-air duct 22 that draws fresh air 78 from exterior portions 80 of a vehicle 14. The recirculating aperture 90 and fresh-air aperture 92 lead into a mixing chamber 94 of the blower assembly 10 where the various amounts of fresh and recirculated air 78, 82 are combined in advance of delivery into the passenger cabin 54 of the vehicle 14. The blower assembly 10 can include at least one conditioned air aperture 96 for receiving heated air from the heater (not shown) of the air-handling system 12 as well as cooled air from an air conditioner (not shown) of the air-handling system 12. In various embodiments, the blower assembly 10 can include a dedicated heated air aperture and a dedicated and separate cooled air aperture for delivering various temperatures of conditioned air 100 from the blower assembly 10 to the passenger cabin 54.

Referring again to FIGS. 1, 6 and 7, between the mixing chamber 94 and the fan 16 of the blower assembly 10 can be disposed a filter 110 for removing various particulate matter from the air moving through the blower assembly 10 such that the various particulate matter can be prevented from being delivered into the passenger cabin 54 for inhalation by the various occupants of the vehicle 14. It is contemplated that the filter 110 can be positioned in other portions of the air-handling system 12, in various embodiments. Below the fan 16 of the blower assembly 10 is disposed an exhaust aperture 112 for delivering the air into the passenger cabin 54 of the vehicle 14. The exhaust aperture 112 can be connected to one or more outlet ducts that deliver air to various portions of the vehicle 14. It is also contemplated that a particular vehicle 14 can include more than one blower assembly 10 for recirculating air into the passenger cabin 54 of the vehicle 14. By way of explanation, and not limitation, one blower for recirculating and delivering air may be disposed towards a front portion of the vehicle 14 and a separate blower can be disposed in a rear portion of the vehicle 14. Alternatively, various blowers for delivering and recirculating air can be disposed in the right and left sides of the vehicle 14.

In the various embodiments, the air-handling system 12 can include a plurality of functions designed to provide air having varying temperatures into the passenger cabin 54. One such function can include an initial pull-down function that can be initiated when the vehicle 14 is initially turned on and/or when the interior temperature of the passenger cabin 54 is substantially above a desired preset cabin temperature. In such an embodiment, when the air conditioner is activated to initiate the pull-down function, the return-air baffle 18 is moved to a full recirculating position 24, wherein a maximum amount of recirculated air 82 from the passenger cabin 54 is drawn into the recirculating snorkel duct 26 and into the blower assembly 10. Accordingly, a minimal amount of fresh air 78 is drawn in through the fresh-air duct 22 into the blower assembly 10. In such an embodiment, the recirculated air 82 drawn into the recirculating snorkel duct 26 and into the blower assembly 10 is continually cooled to lower and lower temperatures in order to maximize the cooling effect of the air conditioner upon the air moving through the air-handling system 12. Accordingly, during the pull-down function, the temperature of the air being delivered into the passenger cabin 54 can be brought to a substantially lower temperature in a more expedient fashion than where the recirculated air 82 is not brought into the blower assembly 10. Other functions for the air-handling system 12 can include a temperature-maintaining function whereby air from the air conditioner can be mixed with air from the recirculating snorkel duct 26 in order to maintain a specific air temperature of the air moving through the blower assembly 10. By mixing the recirculated air 82 with air from the air conditioner, the air conditioner can operate more efficiently and use less resources during the operation of the air-handling system 12.

Referring again to FIGS. 3-5, it is contemplated that the return-air baffle 18 can include a plurality of recirculating positions 24. As to each of these recirculating positions 24, a different, and in some cases, predetermined proportion of fresh air 78 from the exterior 80 of the vehicle 14 and recirculated air 82 from within the passenger cabin 54 can be mixed, reconditioned where desired, and delivered back into the passenger cabin 54 of the vehicle 14. Various settings or functions of the air-handling system 12 can modify the position of the return-air baffle 18 to allow greater or lesser amounts of recirculated air 82 that is mixed with the fresh air 78 through the blower assembly 10. By way of explanation, and not limitation, the air-handling system 12 can include an initial cool-down setting where the temperature within the passenger cabin 54 of the vehicle 14 greatly exceeds a particular temperature set point desired by the occupants of the vehicle 14. In such a condition, the return-air baffle 18 can be moved into a full-recirculation position where the majority of the air moved through the blower assembly 10 is recirculated air 82 drawn in from the passenger cabin 54 through the recirculating snorkel duct 26. The full-recirculation position can also allow a different and typically lesser percentage of fresh air 78 through the fresh-air duct 22 to be mixed with the recirculated air 82 and delivered into the passenger cabin 54 of the vehicle 14. As the temperature of the passenger cabin 54 nears the desired set point temperature, the return-air baffle 18 can be configured to change positions to allow lesser amounts of recirculated air 82 and greater amounts of fresh air 78 to be moved through the mixing chamber 94 of the blower assembly 10 for conditioning and delivery into the passenger cabin 54 of the vehicle 14.

In various embodiments, as illustrated in FIGS. 1-7, the air-handling system 12 can include the heater assembly (not shown) that is coupled to the blower assembly 10 as well as the air conditioner (not shown) that is coupled to the blower assembly 10 for the air-handling system 12 of the vehicle 14. Accordingly, the heating assembly and air conditioner can be used to condition the air that is moved through the blower assembly 10. It is also contemplated that, in various embodiments, the heater assembly and air conditioner can cooperatively operate in order to provide conditioned air 100 for disposition through the blower assembly 10 that has a predetermined temperature as it leaves the air-handling system 12 for delivery into the passenger cabin 54. During operation of the heater assembly, the air conditioner, or both, differing amounts of recirculated air 82 and fresh air 78 can be drawn into the blower assembly 10 as a result of the various recirculating positions 24 of the return-air baffle 18. These functions can cooperate to not only regulate the temperature of the conditioned air 100 being delivered to the passenger cabin 54, but also the relative humidity of the conditioned air 100.

Referring again to FIGS. 1 and 7, during operation of one of the recirculating functions of the air-handling system 12, recirculated air 82 is drawn into the noise-attenuating end 28 of the recirculating snorkel duct 26 that is positioned below the instrument panel 30 of the vehicle 14. In this manner, noise from the fan 16, the heating assembly, the air conditioner, or other aspect of the air-handling system 12, can travel through the blower assembly 10 and also through the recirculating snorkel duct 26. Noise from these various components of the air-handling system 12, sometimes referred to as broadband frequency noise 118, tends to travel through the noise-attenuating end 28 of the recirculating snorkel duct 26 and into the passenger cabin 54 of the vehicle 14. In order to minimize the amount of broadband frequency noise 118 that is directed into upper portions 130 of the passenger cabin 54 where such noise might be heard by the various occupants of the vehicle 14, the noise-attenuating end 28 of the recirculating snorkel duct 26 is pointed into the floor 32 of the passenger cabin 54 of the vehicle 14. In various embodiments, portions of the floor 32 underneath the instrument panel 30 of the vehicle 14 are substantially horizontal relative to the passenger cabin 54. Under such conditions, the recirculating snorkel duct 26 would tend to be positioned substantially vertical relative to the floor 32 such that broadband frequency noise 118 emanating through the noise-attenuating end 28 of the recirculating snorkel duct 26 is directed into the floor 32 of the passenger cabin 54.

In the various embodiments, as illustrated in FIGS. 1-7, the positioning of the recirculating snorkel duct 26 in relation to the blower assembly 10 decreases the amount of turbulence experienced by the air entering the blower assembly 10 and the fan 16 via the recirculating snorkel duct 26 and the noise attenuating end 28 thereof. This decrease in the amount of turbulence of the air decreases the overall system noise and serves to improve the performance of the air handling system 12. A side benefit of this positioning of the recirculating snorkel duct 26 is that the recirculating snorkel duct 26 provides a noise escape path from the noise attenuating end 28 that is directed toward the floor 32 below the instrument panel 30. In this manner, noise is directed away from the occupants' head and ears.

Referring again to FIG. 1, in various alternate embodiments, portions of the floor 32 of the passenger cabin 54 can include an upwardly angled footrest portion 120 where the floorboard of the passenger cabin 54 goes from a horizontal position to an upward angle and substantially into the underside of the instrument panel 30 of the vehicle 14. In such conditions, it is contemplated that the noise-attenuating end 28 of the recirculating snorkel duct 26 can be disposed at an angle perpendicular to the footrest portion 120 of the floor 32 beneath the instrument panel 30 of the vehicle 14. In this manner, and as discussed above, broadband frequency noise 118 leaving the noise-attenuating end 28 of the recirculating snorkel duct 26 is directed perpendicularly into the floor 32 of the vehicle 14.

In various embodiments, the floor 32 of the vehicle 14 beneath the instrument panel 30 can include a carpeted surface or other surface covered in some form of textile material. By directing the broadband frequency noise 118 through the noise-attenuating end 28 of the recirculating snorkel duct 26 and into these carpeted or textile portions of the floor 32, the broadband frequency noise 118 can be at least partially absorbed into the floor 32 without causing the broadband frequency noise 118 to substantially reverberate through the upper portions 130 of the passenger cabin 54 where such noise might be substantially heard by the various occupants of the vehicle 14.

Referring again to FIGS. 1-7, the noise-attenuating end 28 of the recirculating snorkel duct 26 is positioned below the instrument panel 30 of the vehicle 14. During operation of the various cooling functions of the air-handling system 12 of the vehicle 14, conditioned air 100 is delivered through the blower assembly 10 and into the passenger cabin 54. The conditioned air 100 within the passenger cabin 54 being, typically, cooler and heavier than warm air, tends to travel toward lower portions of the vehicle 14. Accordingly, cool air delivered to the passenger cabin 54 during one of the cooling functions of the air-handling system 12 can tend to collect in the lower-front region 52 of the passenger cabin 54 proximate the floor 32 beneath the instrument panel 30 of the vehicle 14. The positioning of the recirculating snorkel duct 26 above these areas tends to result in the collection of this cooler conditioned air 100 during recirculating functions of the air-handling system 12 of the vehicle 14. By collecting this cooler air at the lower-front region 52 of the passenger cabin 54, as opposed to warmer air in upper portions 130 of the passenger cabin 54, the air conditioner and the air-handling system 12 as a whole is placed under less stress in attempting to decrease the temperature of the air pulled into the blower assembly 10 through the recirculating snorkel duct 26. Because the air at the lower-front region 52 of the passenger cabin 54 tends to be cooler, the desired temperature set points within the passenger cabin 54 can be reached in a relatively short time period due to the lower temperature of the recirculated air 82 brought into the air-handling system 12. As such, the amount of time that the air conditioner is required to be activated during a pull-down function or other cooling function is decreased. Accordingly, the air-handling system 12, and the vehicle 14 as a whole, can operate more efficiently in the use of resources during operation of the vehicle 14 and its various systems.

In various embodiments, it is contemplated that the return-air baffle 18 of the air-handling system 12 can include first and second baffles that are disposed proximate the fresh-air duct 22 and the recirculating snorkel duct 26, respectively. In such an embodiment, the first baffle is independently operated in order to control the amount of fresh air 78 pulled into the system. Similarly, the second baffle is disposed proximate the recirculating snorkel duct 26 and controls the amount of recirculated air 82 drawn into the blower assembly 10. In operation, the first and second baffles can be independently operated in order to specifically regulate the amount of fresh air 78 and the amount of recirculated air 82 that is brought into the air-handling system 12 for reconditioning and delivery into the passenger cabin 54 of the vehicle 14. Where two baffles are present, it is contemplated that the first baffle controlling the amount of fresh air 78 being drawn into the cabin remains at least partially open. As such, during operation of the air-handling system 12, at least a portion of the recirculated air 82 delivered to the passenger cabin 54 includes at least some fresh air 78.

Referring now to FIGS. 8-11, it is contemplated that in various embodiments of the blower assembly 10 incorporating the recirculating snorkel duct 26, the blower assembly 10 can be manufactured with a portion of the recirculating snorkel duct 26 preinstalled upon the blower assembly 10. In this manner, the blower assembly 10 can include a snorkel duct adapter 140 that can allow the blower assembly 10 to be installed in any one of the various vehicles as part of that respective vehicle's air-handling system. The snorkel duct adapter 140 can then be connected to a snorkel duct extension 142 that extends from the snorkel duct adapter 140 to the ultimate destination of the noise-attenuating end 28 of the recirculating snorkel duct 26. In this manner, the combination of the snorkel duct adapter 140 and the snorkel duct extension 142 make up the recirculating snorkel duct 26 for the blower assembly 10. In such an embodiment, a single blower assembly 10 having a snorkel duct adapter 140 can be manufactured, thereby saving on the expense of having to manufacture several different blower assemblies 10 each with an individual recirculating snorkel duct 26 attached thereto. In this embodiment, a plurality of different designs for the snorkel duct extension 142 can be implemented and manufactured, where each design corresponds to a different make, model and/or trim of vehicle, which can include the recirculating snorkel duct 26 for the air-handling system 12 of that particular vehicle 14.

Referring again to FIGS. 8-11, the snorkel duct adapter 140 can be configured to essentially cover the recirculating aperture 90 of the blower assembly 10 that is in communication with the return-air baffle 18 of the blower assembly 10. When installed within a particular vehicle 14, the snorkel duct extension 142 is attached to the snorkel duct adapter 140 to form the recirculating snorkel duct 26 in its entirety within the particular vehicle 14.

In the various embodiments, the recirculating snorkel duct 26 can be made of various rigid materials that are substantially unaffected by temperature changes caused by the air moving through the recirculating snorkel duct 26. Such materials can include, but are not limited to, plastic, metal, composite, combinations thereof, as well as other rigid materials. It is also contemplated that the recirculating snorkel duct 26 can include an insulation layer disposed on a portion of the recirculating snorkel duct 26. Such an insulation layer is intended to substantially maintain the temperature of the air moving through the recirculating snorkel duct 26 as it is delivered to the passenger cabin 54 of the vehicle 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicular air-handling system comprising:
   a blower assembly for a vehicle and having a fan;
   a return-air baffle positioned within a mixing chamber of the blower assembly and above the fan, the return-air baffle being operable between a fresh-air position, wherein the fan is in communication with a fresh-air duct and a recirculating position, wherein the fan is at least partially in communication with a recirculating duct, and wherein the fresh-air duct and the recirculating duct are attached to the blower assembly at the mixing chamber; and
   a noise-attenuating end of the recirculating duct positioned below an instrument panel of the vehicle and oriented perpendicular to and above a portion of a floor below the instrument panel, wherein noise from the fan drawing recirculated air through the recirculating duct is directed into the floor below the instrument panel, and wherein recirculated air enters the recirculating duct in a direction perpendicular to the floor below the instrument panel, and wherein the recirculating duct is unobstructed between the noise-attenuating end and the blower assembly.

2. The vehicular air-handling system of claim 1, wherein the noise-attenuating end of the recirculating duct is adapted to draw air from a lower-front region of a passenger cabin of the vehicle proximate the floor below the instrument panel.

3. The vehicular air-handling system of claim 2, wherein the noise-attenuating end includes a longitudinal axis, wherein the longitudinal axis is positioned substantially normal to the floor below the instrument panel.

4. The vehicular air-handling system of claim 2, wherein the recirculating position of the return-air baffle is further defined by the fan being in communication with both the fresh-air duct and the recirculating duct.

5. The vehicular air-handling system of claim 2, wherein the return-air baffle includes a plurality of recirculating positions, wherein each of the plurality of recirculating positions includes a predetermined proportion of fresh air from the fresh-air duct and recirculated air through the recirculating duct.

6. The vehicular air-handling system of claim 1, further comprising:
   an air-conditioning assembly in communication with the blower assembly, wherein the return-air baffle is moved to the recirculating position when the air-conditioning assembly is activated, wherein the air-conditioning assembly engages the blower assembly at the mixing chamber.

7. The vehicular air-handling system of claim 2, wherein the return-air baffle is positioned above the fan and a filter, wherein the fan directs air through an exhaust aperture defined within a bottom of the blower assembly.

8. A vehicular air-handling system comprising:
a blower assembly having a fan; and
a recirculating duct having an upper end in communication with the fan and a noise-attenuating end positioned above a floor at a lower-front portion of a passenger cabin and directed perpendicular to the floor, wherein the recirculating duct is unobstructed between the noise-attenuating end and the blower assembly and noise from the fan is at least partially directed through the noise-attenuating end and into the floor as recirculating air simultaneously enters the noise-attenuating end, wherein the upper end of the recirculating duct and a fresh air duct are coupled to the blower assembly at a mixing chamber of the blower assembly that is at an upstream position of the fan.

9. The vehicular air-handling system of claim 8, wherein the noise-attenuating end of the recirculating duct is adapted to draw air from a lower-front region of a passenger cabin of a vehicle proximate the floor below an instrument panel.

10. The vehicular air-handling system of claim 9, further comprising:
a return-air baffle disposed within the blower assembly, wherein the return-air baffle is disposed over the fan and in selective communication with the upper end of the recirculating duct and the fresh air duct, the return-air baffle is operable between a fresh-air position, where the fan is in communication with a fresh-air duct, and a recirculating position, where the fan is at least partially in communication with the recirculating duct.

11. The vehicular air-handling system of claim 10, wherein the recirculating position of the return-air baffle is further defined by the fan being in communication with both the fresh-air duct and the recirculating duct.

12. The vehicular air-handling system of claim 9, wherein the noise-attenuating end includes a longitudinal axis, wherein the longitudinal axis is positioned substantially normal to the floor below the instrument panel.

13. The vehicular air-handling system of claim 10, wherein the return-air baffle includes a plurality of recirculating positions, wherein each of the plurality of recirculating positions includes a predetermined proportion of fresh air from the fresh-air duct and recirculated air through the recirculating duct.

14. The vehicular air-handling system of claim 10, wherein the return-air baffle directs air from at least one of the fresh-air duct and the recirculating duct to the passenger cabin through an exhaust outlet positioned within a bottom of the blower assembly.

15. A vehicular air-handling system comprising:
a blower assembly disposed within a vehicle instrument panel and having a fan, wherein the blower assembly includes a snorkel duct adapter positioned proximate a return-air baffle; and
a recirculating duct coupled with the snorkel duct adapter and in communication with the fan, the recirculating duct being unobstructed between the snorkel duct adapter and a noise-attenuating end located above a floor, the noise-attenuating end including a longitudinal axis, wherein the longitudinal axis of the noise-attenuating end is positioned normal to a surface of the floor disposed below the vehicle instrument panel, wherein noise from the noise-attenuating end is directed into the surface of the floor as recirculated air enters the noise-attenuating end in a direction along the longitudinal axis.

16. The vehicular air-handling system of claim 15, wherein the noise-attenuating end of the recirculating duct is adapted to draw air from a lower-front region of a passenger cabin of a vehicle proximate the surface of the floor below the vehicle instrument panel.

17. A vehicular air-handling system of claim 16, wherein the recirculating duct includes an upper end connected with the blower assembly and positioned proximate a return-air baffle disposed within the blower assembly, wherein the return-air baffle is operable between a fresh-air position, wherein the fan is in communication with a fresh-air duct, and a recirculating position, wherein the fan is at least partially in communication with the recirculating duct.

18. The vehicular air-handling system of claim 17, wherein the recirculating position of the return-air baffle is further defined by the fan being in communication with both the fresh-air duct and the recirculating duct.

19. The vehicular air-handling system of claim 17, wherein the return-air baffle includes a plurality of recirculating positions, wherein each of the plurality of recirculating positions includes a predetermined proportion of fresh air from the fresh-air duct and recirculated air through the recirculating duct.

20. The vehicular air-handling system of claim 17, wherein the return-air baffle is disposed within a mixing chamber of the blower assembly, and wherein the return-air baffle includes a plurality of baffle portions that are each disposed within the mixing chamber and cooperate to regulate an amount of fresh air and an amount of recirculated air that is drawn into the mixing chamber by the blower assembly.

* * * * *